(12) United States Patent
Iversen

(10) Patent No.: US 7,934,585 B2
(45) Date of Patent: May 3, 2011

(54) METHOD OF SERVICING THE OUTER COMPONENTS OF A WIND TURBINE SUCH AS THE WIND TURBINE BLADES AND THE TOWER WITH A WORK PLATFORM AND WORK PLATFORM

(75) Inventor: Paul Iversen, Varde (DK)

(73) Assignee: Vestas Wind Systems A/S (DK)

( * ) Notice: Subject to any disclaimer, the term of this patent is extended or adjusted under 35 U.S.C. 154(b) by 1002 days.

(21) Appl. No.: 10/554,130

(22) PCT Filed: Apr. 15, 2003

(86) PCT No.: PCT/DK03/00257
§ 371 (c)(1),
(2), (4) Date: Oct. 16, 2006

(87) PCT Pub. No.: WO2004/092577
PCT Pub. Date: Oct. 28, 2004

(65) Prior Publication Data
US 2007/0056801 A1    Mar. 15, 2007

(51) Int. Cl.
*B66F 11/04* (2006.01)
(52) U.S. Cl. ........................................ 182/142; 182/145
(58) Field of Classification Search .................. 182/142, 182/145
See application file for complete search history.

(56) References Cited

U.S. PATENT DOCUMENTS

| 3,837,428 | A | * | 9/1974 | Gish | 182/129 |
|---|---|---|---|---|---|
| 4,424,884 | A | * | 1/1984 | Smith, Jr. | 182/12 |
| 4,602,698 | A | * | 7/1986 | Grant | 182/142 |
| 4,738,335 | A | * | 4/1988 | Ishii | 182/129 |
| 5,351,783 | A | * | 10/1994 | Celli | 182/133 |
| 7,207,777 | B2 | * | 4/2007 | Bervang | 416/119 |
| 2004/0168854 | A1 | * | 9/2004 | Azran | 182/141 |

FOREIGN PATENT DOCUMENTS

| DE | 296 03 278 | | 4/1996 |
|---|---|---|---|
| DE | 197 26 408 | | 3/1999 |
| DE | 19726408 | C1 * | 3/1999 |
| FR | 1 289 700 | | 4/1962 |

OTHER PUBLICATIONS

International Search Report; PCT/DK03/00257; Oct. 17, 2003.

* cited by examiner

*Primary Examiner* — Alvin C Chin-Shue
(74) *Attorney, Agent, or Firm* — St. Onge Steward Johnston & Reens LLC

(57) ABSTRACT

The invention relates to a method of servicing the outer components of a wind turbine such as the wind turbine blades and the tower with a work platform, said method comprises the steps of: positioning the work platform at the wind turbine tower and connecting the work platform to an upper part of the wind turbine with at least one cable. Further the method comprises the steps of raising the work platform with the cable and cable winding means to a position of use, and holding the work platform to the side of the wind turbine tower with holding means. The invention also relates to a work platform for servicing the outer components of a wind turbine.

28 Claims, 13 Drawing Sheets

METHOD OF SERVICING THE OUTER COMPONENTS OF A WIND TURBINE SUCH AS THE WIND TURBINE BLADES AND THE TOWER WITH A WORK PLATFORM AND WORK PLATFORM

BACKGROUND OF THE INVENTION

The invention relates to a method of servicing the outer components of a wind turbine such as the wind turbine blades and the tower with a work platform and a work platform.

DESCRIPTION OF THE RELATED ART

Normally, wind turbines are erected in places in which the wind conditions are advantageous e.g. in places with few obstacles blocking or altering the path of the wind. This means that the wind turbines often are positioned in more or less remote places with a poor infrastructure such as in terms of road quality.

This creates some problems in relation to the necessary maintenance of the outer components of the wind turbines such as the wind turbine blades or the surface of the wind turbine tower. The magnitude of the problems has accumulated significantly in recent years with the increasing size of the wind turbines.

Previously, freestanding cranes or lifts have been used in connection with maintenance or reparation of the outer components of the wind turbines. However, with the poor infrastructure, the transportation of the cranes or lifts to the erection places of the wind turbines is somewhat costly and time consuming.

In order to overcome the problem of transporting large and heavy equipment to the erection places different solutions have been suggested.

One has been using persons lowering them selves down the side of the wind turbine tower or blades using ropes connected to the nacelle. However, the method naturally requires experts in climbing and is somewhat restricted in the work possibilities on the wind turbine and as such not a feasible solution to the problems of maintenance or reparation of the outer components of the wind turbines.

Another has been the installation of a crane and a cable basket underneath the nacelle of the wind turbine allowing the basket to be lowered down the side of the wind turbine. However, the basket is difficult to position correctly and difficult to work from due to its unstable nature.

BRIEF SUMMARY OF THE INVENTION

The invention establishes a method and system for wind turbines without the above-mentioned disadvantage.

The invention creates a method and system which allow one or more workers to be positioned at any adjacent position outside the wind turbine such as near one of the wind turbine blades without involving heavy equipment on the ground.

Further, the invention creates a method and system which allow safe and stable conditions for the workers.

The invention relates to a method of servicing the outer components of a wind turbine such as the wind turbine blades and the tower with a work platform, said method comprises the steps of:
positioning the work platform at the wind turbine tower,
connecting the work platform to an upper part of the wind turbine with at least one cable,
raising the work platform with the cable and cable winding means to a position of use, and
holding the work platform to the side of the wind turbine tower with holding means.

Hereby it is possible to establish a method that allows safe and stable conditions for one or more workers performing service on the outer components of a wind turbine such as the wind turbine blades and the tower.

In an aspect of the invention, said holding is established with at least two sets of suction or vacuum cups, allowing an easily controllable but still firm hold on the wind turbine tower.

In a further aspect of the invention, said holding is enhanced by positioning said suction or vacuum cups on the ends of holding arms, said arms gripping around the exterior of the wind turbine tower. Hereby it is possible to establish a grip around the wind turbine tower, the grip being advantageous in absorbing and withstanding any twists in the work platform.

In an even further aspect of the invention, said method further comprises the step of moving the work platform horizontally by extracting or retracting horizontal forcing means of the work platform. Hereby it is possible to position the work platform at any adjacent position outside the wind turbine such as near one of the wind turbine blades.

In another aspect of the invention, the extracting or retracting is established telescopically by a number of arm sections in said horizontal forcing means. Hereby a preferred embodiment of the invention is achieved that is simple to construct and control during use.

In a further aspect of the invention, cable guiding means angles the cable outwards in relation to the wind turbine tower from the starting point of the cable. Hereby an advantageous embodiment of the invention is achieved.

In an even further aspect of the invention, said work platform is moved up or down by following and rolling with steering wheels of the platform on the surface of the wind turbine tower. Hereby a further advantageous embodiment of the invention is achieved.

The invention also relates to a work platform, said platform further comprises gripping means for holding the work platform to the tower. Hereby it is possible to establish an apparatus that allows safe and stable conditions for one or more workers performing service on the outer components of a wind turbine such as the wind turbine blades and the tower.

In an aspect of the invention, said at least one cable comprises a number of outer cables, said set including a main cable and one or more additional cables.

In a further aspect of the invention, said at least one cable further comprises an inner cable or cables.

The more than one cable may enhance the safety level of the work platform.

In an aspect of the invention, said inner and outer cables are fixed to the underside of the wind turbine nacelle at an inner and outer anchorage point in direction from the tower or to anchorage points inside the nacelle.

In an aspect of the invention, said gripping means comprises at least two sets of suction or vacuum cups. With two or more sets of suction or vacuum cups it is possible to engage the wind turbine tower from more than one side e.g. from opposite sides ensuring a more firm grip. However it shall be emphasized that the gripping means may be established with just one set of suction or vacuum cups engaging the tower in one position. The position is preferably in front of the work platform ensuring a balance for the platform around the position.

The suction or vacuum cups may be used in connection with any type of wind turbine tower such as towers made in metal or concrete.

In another aspect of the invention, said gripping means comprises at least two sets of electromagnetic means. The electromagnetic means may be one or more electromagnets in which the electric power supply for the magnets is controlled in order to hold on to/let go of the metal surface of the tower.

In a further aspect of the invention, said gripping means comprises retaining means surrounding the wind turbine tower such as at least one retaining belt or band. The retaining means surround the tower totally or partly and are connected to the gripping means in which the gripping means may tighten or release the retaining means in order to hold the work platform at the position or to allow movement of the platform, respectively. The belt or band is preferably made in iron or an iron alloy. Further, the belt or band may be made in other materials such as a reinforced composite or woven material.

In another aspect of the invention, each of said at least two sets of suction or vacuum cups or electromagnetic means are flexibly mounted to the end of a holding arm. With the flexible mounting of the cups or electromagnetic means an advantageous possibility of adapting the holding arms to the more or less uneven surface of the wind turbine tower is achieved. Further, with the flexible mounting the inclination of the tower does not affect the functionality of the cups or electromagnetic means.

In a further aspect of the invention, said holding arm includes a base arm section, inner arm section and outer arm section. By the sectioning of the arms, an ability of angling the arms individually is achieved in order to grip different sized wind turbine towers.

In an even further aspect of the invention, said inner arm section and outer arm section are pivotally connected and controlled by arm actuating means in at least one direction. Hereby it is possible to adapt the arm sections to the inclination of the tower in question regardless of the (small) size of the inclination.

In another aspect of the invention, said gripping means comprises one or more steering wheels. With the steering wheels it is easy to vertically move and roll the, work platform to a given position of use. Further the steering wheels help controlling the path that the work platform follows when it is moved up or down the surface of the wind turbine tower.

In an aspect of the invention, guard rails and a foundation define a work area of said platform. As modern wind turbines comprises a nacelle height of more than 50 meters the workers need protection from falling of the platform e.g. as a result of an unexpected wind gust or the like.

In an aspect of the invention, said gripping means and the foundation are connected through horizontal forcing means. With the ability of forcing or moving the work platform horizontally, it is possible to work with different outer components of the wind turbine regardless of their position in relation to the wind turbine tower. Especially with modern wind turbines, in which the distance between the tower and the wind turbine blades may be between 5 and 10 meters, the ability of moving the work platform horizontally is advantageous.

In an aspect of the invention, said horizontal forcing means includes a number of horizontal forcing arms. With a number of arms, instead of one long arm, the forcing means may be constructed with a smaller length.

In an aspect of the invention, said horizontal forcing arms are integrated into each other as part of telescopic forcing means. With the telescopic adaptation the necessary length may be obtained with a more compact construction of the forcing means. Further, the telescopic forcing means ensures that the horizontal forcing of the work platform is achieved with a linear approach of the forcing means.

In an aspect of the invention, the side or sides of said platform includes one or more indentations for receiving and docking one or more wind turbine blades. The receiving and docking of the blade in an indentation is especially important as the indentation defines an area that at least partly surrounds the blade. The surrounding ensures that the blade may be retained from different positions e.g. retraining the leading or trailing edge together with both sides of the blade. Further, the workers may approach and get close to both sides of the blade without dangerously leaning out over the guide rails.

In a special embodiment the blade may enter the indentation and subsequently be surrounded by the work platform wherein the surrounding is achieved by closing a pivotally connected section of the platform behind the blade. The section preferably comprises the necessary guide rails allowing the workers to walk around the blade in its full circumference.

It shall be emphasised that the blade may be docked at any position along the sides of the work platform. The indentations are merely adapted for a safer docking by allowing a better retaining of the blade.

In an aspect of the invention, said platform includes retaining means for retaining the wind turbine blade in one of said indentations. The retaining means are important as they ensure that any movements in the blade is retained e.g. at a wind gust and thus protect the workers from potential injuries during the work on the blade. As the blade is positioned in an indentation the retaining means may attack from opposite side against the surface of the blade ensuring a solid and continuing hold on the blade.

In an aspect of the invention, said retaining means includes one or more suction or vacuum cups positioned on one or more rods as base part for the retaining means. The hold by suction or vacuum cups ensures both the solid and continuing hold of the blade and at the same time a gentle hold without any pressure marks on the blade.

In an aspect of the invention, said cable is controlled by cable guiding means e.g. by one or more cable guidance wheels in said means. The abrasion of the cable may be avoided and thus ensuring the security of the worker on the platform.

In an aspect of the invention, said cable guiding means controls the angling of the cable. By controlling the angling of the cable, it is possible to achieve different advantageous characteristics such as forcing the work platform against the tower. By forcing the platform against the tower the necessary strength of the gripping means may be reduced.

In an aspect of the invention, control means at least controls said arm actuating means, horizontal forcing means, said one or more suction or vacuum pumps and/or said cable winding means.

In another aspect of the invention, said control means is connected wired or wirelessly to and controlled by at least one remote control. Equipped with a remote control the worker may move more freely on the platform and control the components of the platform more precisely and thus is both the flexibility and the security of the platform enhanced.

In a further aspect of the invention, said control means and auxiliary devices are controlled with more than one remote control, said controls work in a master and slave configuration. Hereby it is possible to control components of the work platform or with the auxiliary devices components of the wind turbine, such as the turning of the rotor, from different positions e.g. the work platform and the ground or the nacelle.

FIGURES

The invention will be described in the following with reference to the figures in which FIG. 1. illustrates a large modern wind turbine, FIG. 2a illustrates a work platform according to the invention moving upwards on the side of a wind turbine tower, FIG. 2b illustrates the work platform in a use situation, FIG. 3 illustrates in more details the work platform on the side of a wind turbine tower, FIG. 4 illustrates the positioning of a wind turbine blade in relation to the work platform, the platform seen from below, FIG. 5 illustrates in perspective the work platform according to a preferred embodiment of the invention, FIG. 6 illustrates the connection between the wind turbine and the work platform including a section hereof, FIGS. 7a and 7b illustrate the work platform in which the pushing actuator means are in two different extraction positions, FIGS. 8a to 8c illustrate different extraction positions of a preferred embodiment of the pushing actuator means, FIGS. 9a and 9b illustrate a preferred embodiment of suction or vacuum cups according to the invention in front and rear views, FIGS. 10a and 10b illustrate a preferred embodiment of cable winding means including a box holding the cable winding means, FIG. 11 illustrates a flow diagram relating to a method of servicing the outer components of a wind turbine, and FIG. 12 illustrates an embodiment of a control system in connection with a work platform according to the invention.

DETAILED DESCRIPTION

FIG. 1 illustrates a modern wind turbine 1 with a tower 2 and a wind turbine nacelle 3 positioned on top of the tower. The wind turbine rotor 5, comprising three wind turbine blades, is connected to the nacelle through the low speed shaft which extends out of the nacelle front.

As illustrated in the figure, wind beyond a certain level will activate the rotor due to the lift induced on the blades and allow it to rotate in a perpendicular direction to the wind. The rotation movement is converted to electric power, which is usually supplied to the transmission grid as known by skilled persons within the area.

FIG. 2a illustrates a work platform 6 according to the invention moving upwards on the side of a wind turbine tower in connection with a maintenance or reparation job on the wind turbine 1.

Further, it is illustrated that the wind turbine blades are pitched out of the wind (parallel with the wind) and not moving as the wind turbine is stopped during the job. The figure also illustrates that a worker is positioned inside the work platform.

The work platform is connected to the wind turbine nacelle 3 with at least one cable 7 in which the cables arrive at the nacelle from a position underneath the nacelle. The work platform also comprises gripping means 8 that substantially horizontal reaches out against the side of the wind turbine tower 2.

The cables 7 may be an integrated part of the wind turbine located inside the nacelle and lowered to the ground through openings in the bottom of the nacelle. Further, the cable may arrive together with the work platform 6 and be transported to the nacelle e.g. by a worker carrying the cable to the nacelle using the stairs inside the wind turbine, securely fastening one end of the cable to the nacelle and lowering the other end down to the ground.

Another way would be to carry a thin rope to the nacelle and lower it down to the ground, tie it to a cable end and drag the cable up to the nacelle on the outside of the wind turbine tower e.g. with the aid of a lifter in the nacelle before securely fastening the cable to the nacelle.

After the cable has reached the ground or the nacelle, it is fastened to cable winding means of the work platform allowing the work platform to be raised from the ground by winding the cable on the work platform.

However, in a further embodiment the cable winding means may be positioned in the nacelle and the cable thus only firmly secured to the work platform;

The accumulators may, in another embodiment of the work platform, be replaced or supplemented with a diesel generator positioned on the work platform.

Finally, the figure illustrates that the work platform was transported to the place of the wind turbine on a trailer connected to a truck 9 e.g. the normal service truck of the company servicing wind turbines. The truck may include different tools or machinery needed in connection with the maintenance and reparation job. Further, the truck may be used in supplying power to the necessary electric accumulators or air containers of the work platform e.g. during transportation by charging the accumulators from the generator of the truck, or the containers from a compressor.

FIG. 2b illustrates the work platform in a use situation at the tip of a wind turbine blade 5 in which the blade is ready for servicing by the worker on the platform.

In order to arrive at the position of FIG. 2b from the position of FIG. 2a the work platform is lifted with the cable winding means while steering wheels of the gripping means 8 are forced against the wind turbine tower allowing the work platform to roll over the surface of the tower during the displacement.

After arrival at the position of use the work platform is still connected to the nacelle through the cables 7 but is also connected to the tower through the gripping means 8 which grippes the wind turbine tower 2 at least two positions (as will be explained in further details below).

The wind turbine blade is twisted to a position in which the worker has access to the surface of the blade (the blade being in a position substantially perpendicular to the wind at the figure). The wind turbine blade is also secured to the work platform in order to avoid any unintended movement of the blade during the work process.

When the work is done at the position the gripping means 8 are released from the tower and the cable winding means lifts (and rolls) the work platform to a new position in which the gripping means 8 are once again secured to the tower. This may be repeated until the blade in its full length has been serviced.

Hereafter the other wind turbine blades may undergo the same procedure. The blade to undergo the procedure is rotated to meet the side of the work platform in which the movement may be achieved by turning the high speed shaft linking the generator and the gear in the nacelle e.g. by an auxiliary device comprising an electric motor. Further, the movement may be achieved by using the generator as an electric motor taking electric energy from the public electric grid. Even further, a movement may be achieved by slightly and briefly pitching one or more blades into the wind.

FIG. 3 illustrates a preferred embodiment of the work platform 6 according to the invention positioned on (and partly concealed by) the wind turbine tower 2.

The work platform is constructed with a foundation 18 surrounded by guard rails 13 in which the foundation and the guide rails defining a work area for the worker or workers.

The work platform further comprises cable guiding means 12 guiding two cables 7a, 7b to cable winding means 43. The cable winding means 43 comprises motor and gearing means in which the gearing means has a high gearing ratio e.g. 1500 motor shaft rotations for each cable winding.

The work platform further comprises a box 10 at the side wherein different hydraulic and/or pneumatic components may be positioned (as will be explained in connection with FIGS. 10*a* and 10*b*).

In a first embodiment the cable winding means 43 are positioned at the foot of the cable guiding means 12 in which the winded cables 7 continue freely down under the platform or even stay on the floor of the platform. In another embodiment of the invention the cables may be accumulated in a cable drum positioned inside the box 10 or another suitable place at the work platform.

The cable guiding means 12 comprises a number of guidance wheels that direct the cables 7*a*, 7*b* to the cable winding means 43 and protect the cable from abrasion. The cable guiding means is preferably positioned centrally on the platform or the outer section of the platform in relation to the tower.

In a situation in which the horizontal forcing means is fully retracted, the cables are vertical or preferably slightly angled to meet the cable guiding means. The angling of the cable is outwardly in relation to the wind turbine tower from its anchorage point of the wind turbine ensuring that the work platform, regardless of the degree of extraction of the horizontal forcing means, is forced against the tower. The angling is established with the positioning of the cable guiding means on the work platform and the anchorage point.

In order to freely adapt the work platform to different anchorage points the point of attack of the cable guiding means may be moved horizontally. As the point of attack may be seen as the cable guidance wheels of the cable guiding means the movement of the attack point may be achieved by moving the wheels. The moving may be established by having sets of openings for holding the shafts of the cable guidance wheels in which the sets are spaced apart.

The work platform also comprises different docking areas 11*a*, 11*b* for a wind turbine blade. The first docking areas 11*a* are indentations on the opposite side of the work platform in which the blade is allowed to enter one of the indentations with the front or trailing edge facing the work platform. When the blade is positioned in the indentation, retaining means from the work platform is forced against the sides of the blade keeping the blade fixed in relation to the work platform.

With indentations on opposite side of the work platform it is possible to service wind turbine blades from both sides of the platform but the work platform may also work with just one first docking area 11*a*. The first docking areas and further docking areas are described in relation to FIG. 4.

The figure further illustrates the one (non-concealed) half of the gripping means 8 of the work platform. The gripping means includes an arm stretching out along the side of the wind turbine tower. The arm fairly follows the surface of the wind turbine tower by comprising a number of arm sections pivotally connected to each other. The gripping means 8 comprises a steering wheel 14 approximately at half-length of the arm, the wheel being forced against the surface of the tower 2. Further, at the end of the gripping means 8, holding means 15 is positioned for holding onto the wind turbine tower 2.

FIG. 4 illustrates the positioning of a wind turbine blade in relation to the work platform, the platform seen from below.

The figure illustrates blades positioned in docking areas; on one side of the work platform (solid line in the presentation a cross section of the blade) and on the opposite side (dotted line). The blades are both docked with the leading or trailing edge facing the side of the work platform and the diametrical line of the blades being perpendicular to the longitudinal direction of the platform. The figure also illustrates a situation in which the blade is docked parallel with the longitudinal direction of the platform in a further indentation 11*b* (dotted line). The blade may be retained in the further indentation by securing a strap around the blade and fixing the strap ends to the guide rail.

The figure further illustrates the retaining means being forced against the sides of the wind turbine blade. Each of the retaining means comprises a head and a base 16*a*, 17*a*; 16*b*, 17*b*, respectively. The retaining means may simply be rubber heads or similar flexible members on rods forced against the sides and fastened to the work platform ensuring that the blade is retained. However, the retaining heads may also be suction or vacuum cups e.g. with connection to a vacuum pump.

FIG. 5 illustrates the preferred embodiment of the work platform in its entirety and in perspective.

Especially the figure illustrates the gripping means 8 in its entirety with both holding arms stretching out to grip the wind turbine tower at two positions with the holding means 15*a*, 15*b* or to roll on the surface of the tower with the two steering wheels 14*a*, 14*b*.

As it is also seen on the figure each arm of the gripping means 8 comprises a base arm section 21*a*, 21*b* connected to an inner arm section 20*a*, 20*b*, said inner arm is connected to an outer arm section 19*a*, 19*b*. The base arm sections are further connected to each other and the work platform through a base part comprising horizontal forcing means 23.

The connection between the base and the inner arm sections is made rigid by a sidepiece. The connection between the inner and the outer arm sections 19*a*, 20*a*; 19*b*, 20*b* is made variable by using a pivotal connection and arm actuating means 22*a*, 22*b*, such as linear electric, hydraulic or pneumatic actuators, allowing the outer arm sections and especially the holding means 15*a*, 15*b* to be moved closer to or further away from each other.

Further, the figure illustrates another cable 7*c* extending toward the work platform and entering at cable guidance means on the platform. The cable guidance means directs the cable 7*c* to the cable winding mechanism 44 at the centre of the gripping means 8.

Finally, the figure illustrates one of the retaining means 16*b*, 17*b* for retaining a wind turbine blade in greater details.

The work platform, and especially the essential parts, such as the foundation of the work platform 18, the horizontal forcing means 23 and/or the gripping means 8, are preferably made in steel or steel alloys.

However, other metals may be used in the construction of the work platform such as aluminium or aluminium alloys. Further different composite materials may be used such as glass, aramid or carbon fibre materials.

The cables connecting the work platform with the upper part of the wind turbine are preferably steel wires. Ropes such as a nylon rope may also be used if the strength of the ropes is significant enough to hold the platform including the workers.

FIG. 6 illustrates the connection between the wind turbine and the work platform. The connection comprises several cables 7 that extend from the nacelle 3 to different positions on the work platform 6. The cables are divided in inner or outer cables in which the terms "inner" and "outer" are to be understood as their position in relation to the surface of the wind turbine tower.

In a preferred embodiment the inner and outer cables are connected to different anchorage points on the underside of the nacelle. The points are positioned somewhere between the wind turbine tower 3 and the wind turbine rotor 5 with the inner point closer to the tower than the outer point e.g. 0.2 and 1.2 meter from the tower, respectively.

The inner and outer cables extend to an inner and an outer position at the work platform in which they are connected to separate cable winding mechanisms 43, 44, as explained in relation to FIGS. 3 and 4.

The enlarged section view further illustrates a preferred embodiment of the invention and especially the extension of the inner 7c and outer cables 7a, 7b from the underside of the nacelle.

The inner cable is illustrated as one cable 7c that extend from an inner anchorage point to the inner position at the work platform with the inner cable winding mechanism 44. The inner cable forms an angle α with the underside of the nacelle.

The angle is preferably 90 degrees, the cable extends vertically, or less than 90 degrees, the cable extends outwardly in relation to the tower from the anchorage point.

The outer cables are illustrated as two cables 7a, 7b that extends from an outer anchorage point 45 to the outer position at the work platform. As explained above, the cable guiding means 12 is the outer position at the work platform that guides the cables to the outer cable winding mechanism 43. The outer cables form an angle β with the underside of the nacelle. The angle is preferably 90 degrees, the cables extend vertically, or less than 90 degrees, the cables extend outwardly in relation to the tower from the anchorage point.

The anchorage points may be eyelets or similar preinstalled connection points on the underside of the nacelle. In order to get to the anchorage points, the nacelle may comprise one or more small openings in the floor of the nacelle allowing a worker to position the cable at the anchorage point. Alternatively, the cables may enter the nacelle through openings and be fixed to anchorage points inside the nacelle.

The function of the cables 7a, 7b, 7c is the moving of the work platform, i.e. lifting or lowering the work platform. The inner cable ensures that the inner section of the work platform, including the gripping means 8, is correctly moved regardless of the conditions of the surface that the steering wheels 14 meet on the wind turbine tower.

The outer cables ensure that the work platform as such is moved and especially that the outer section of the work platform is moved. The outer cables are divided into a main cable and one or more additional cables for security reasons. The main cable may single-handed carry the weight of the work platform but in case of a cable break the additional cables will maintain the work platform at the position. Further, the winding speed of the cables are monitored by safety means ensuring that the winding speed does not exceed an upper limit such as 4 meters per minute. The safety limit ensures that the work platform is not handled at dangerously high speeds, e.g. by the worker, under normal conditions or at failure situations such as a breakdown in a cable winding mechanism. The overspeed safety means is preferably electro/mechanical devices of a centrifugal or a magnetic motion type that slows down or temporarily stops the work platform. The safety means may also stop the work platform in a situation of cable overwind or weight overload.

In order to keep the work platform horizontal or at least relatively horizontal, the platform comprises level indication means. The level indication means may be a part of the control system, described in relation with FIG. 12, and as such be part of the system generating control signals for the cable winding mechanisms ensuring the horizontal position of the work platform. The level indication means may be combined with tension means monitoring the tension on each of the different cables. Both at vertical and horizontal movement of the work platform it is important to monitor and ensure the horizontal position of the work platform, and it may be achieved by controlling the cable winding mechanisms individually e.g. in order to achieve the horizontal position and level the strain on the cables.

In a basic embodiment of the invention the number of cables is set to just one cable wherein the cable is extended to an outer position of the work platform such as the cable guiding means 12.

Further, the cables may be fixed to the work platform and connected with cable winding mechanisms in the nacelle.

FIGS. 7a and 7b illustrate the work platform and especially the horizontal forcing means 23 in two different positions.

FIG. 7a illustrates the first position in which the horizontal forcing means 23 is fully retracted. The retraction of the horizontal forcing means 23 will position the work platform close to the wind turbine tower, e.g. allowing inspection and repair of the surface of the tower. Further, the position will be the normal position during truck transportation of the work platform as well as the normal position during the initial lifting of the work platform along the wind turbine tower.

FIG. 7b illustrates a second position in which the horizontal forcing means 23 is partly extracted.

As seen on the figure, the horizontal forcing means 23 includes a number of horizontal forcing arms. The arms may preferably be four-sided tubes in which the tubes are telescopically integrated into each other. The tubes may be extracted or retracted successively or individually by means of electric, hydraulic or pneumatic means.

The electric means may include one or more electric motors driving one or more spindles. The hydraulic or pneumatic means may include a piston driven by the hydraulic or pneumatic forces.

The extraction of the horizontal forcing means 23 will position the work platform away from the wind turbine tower, e.g. allowing service of the surface of the wind turbine blades.

As the distance between the wind turbine tower and the blades are quite significant at modem wind turbines, the horizontal forcing means 23 should at full extraction be of a certain length such as between 5 and 10 meters in order to be able to service any type of modern wind turbine.

It should be understood that the term "horizontal forcing means" means that the forcing means preferably acts in a substantially horizontal direction against the wind turbine tower. However, the forcing means may in other embodiments be sloped to an angle significantly above or below the horizontal direction.

FIGS. 8a to 8c illustrate the structure of a preferred embodiment of the horizontal forcing means 23.

The forcing means comprises a fixed part 25 holding the extractable and retractable horizontal forcing arms 23a, 23b. The fixed part is normally mounted underneath the foundation 18 of the work platform in its full length.

The dotted lines may be seen as the surface of the wind turbine tower or the holding means 15 which the rest of the work platform is moved away from with the extraction of the forcing means.

Figure 1:
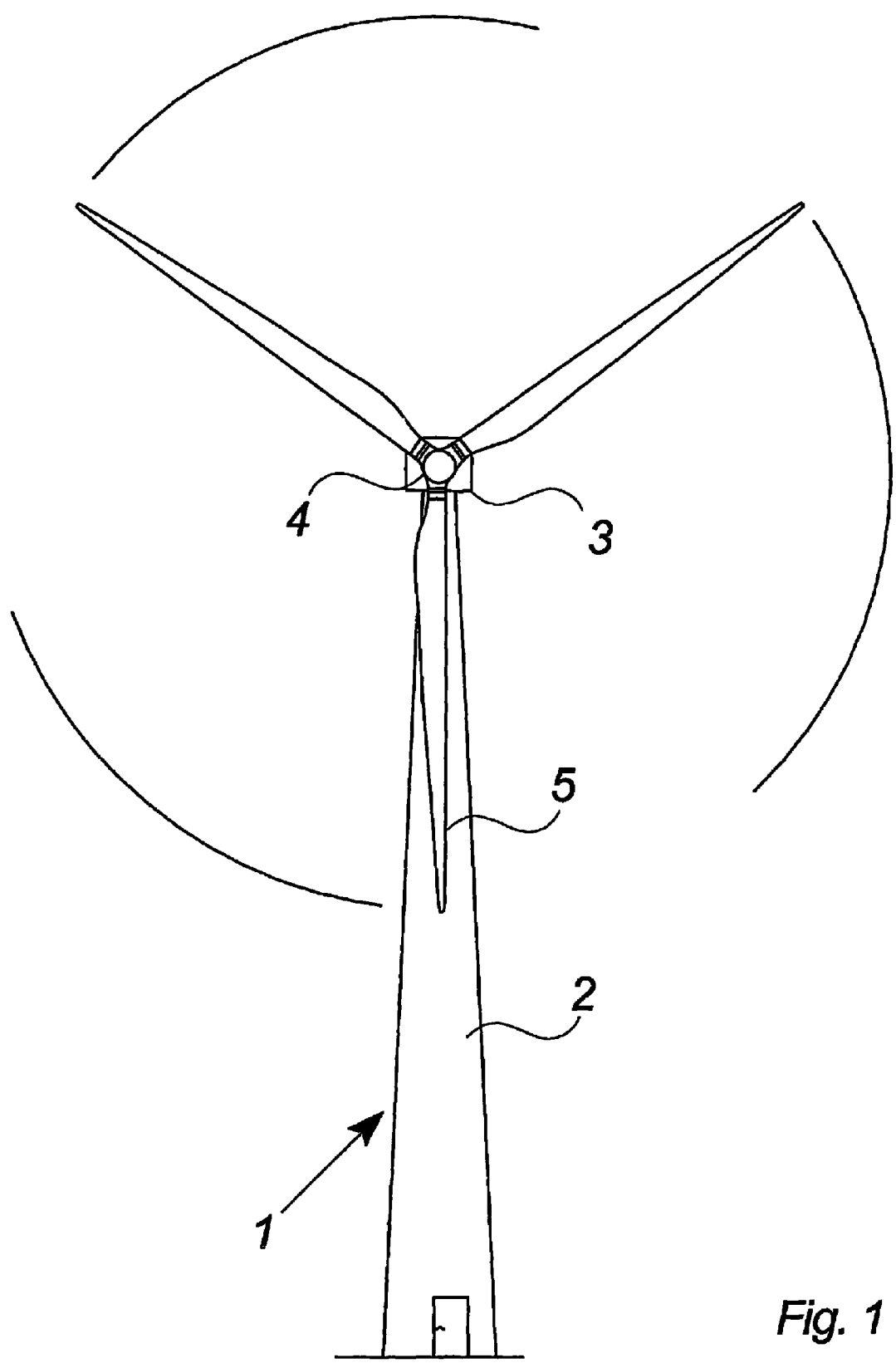
Figure 2A:
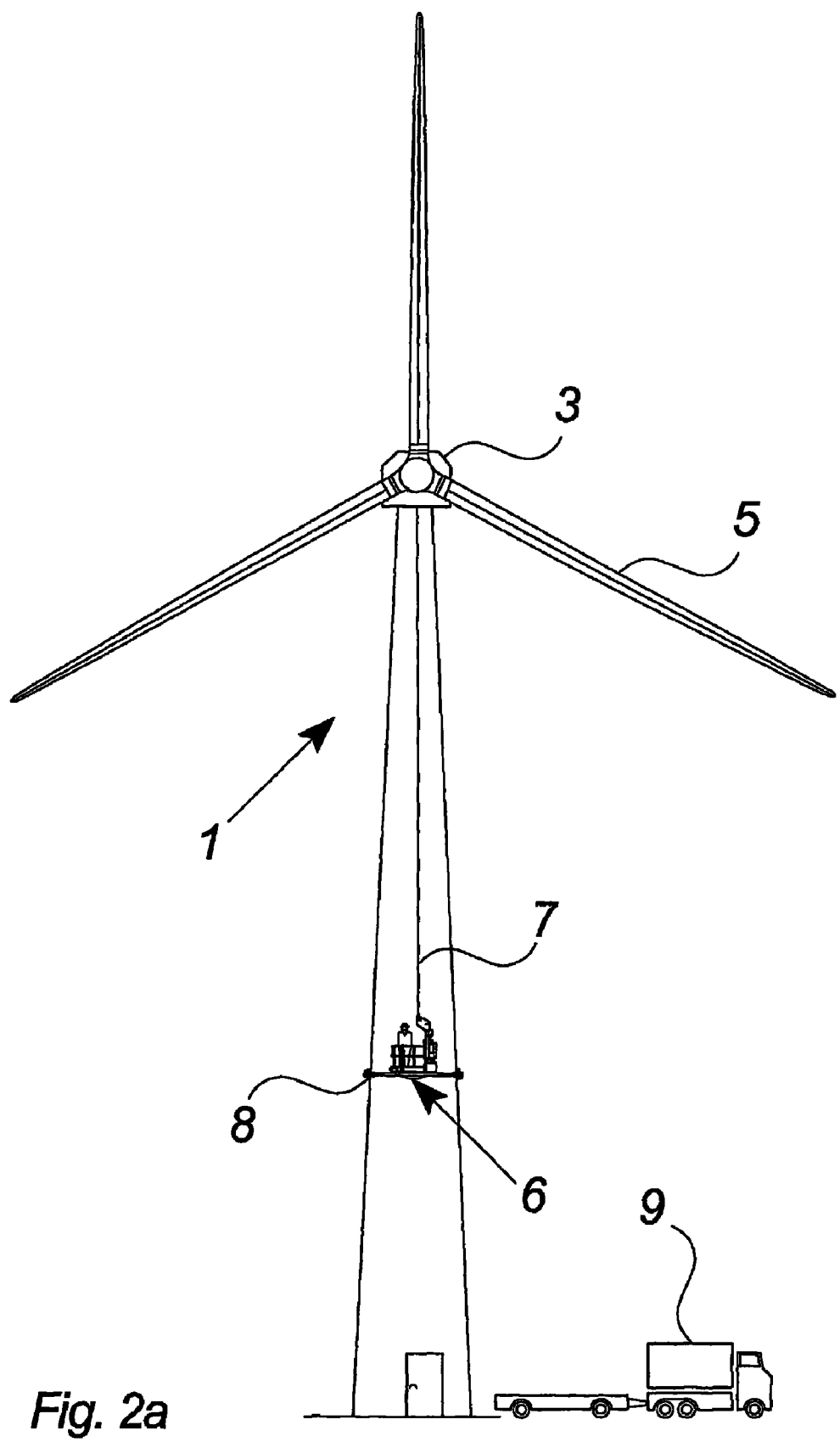
Figure 2B:
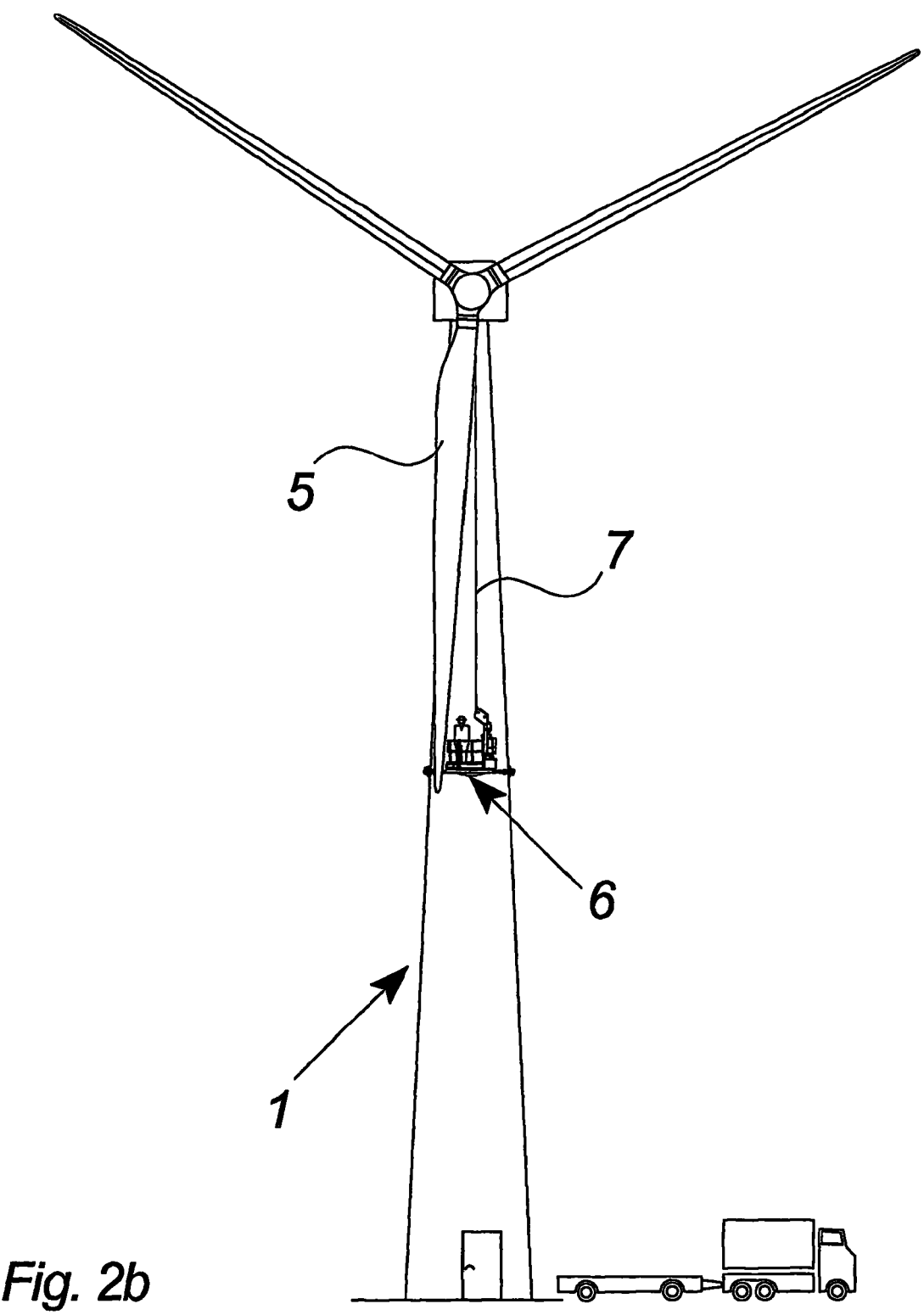
Figure 3:
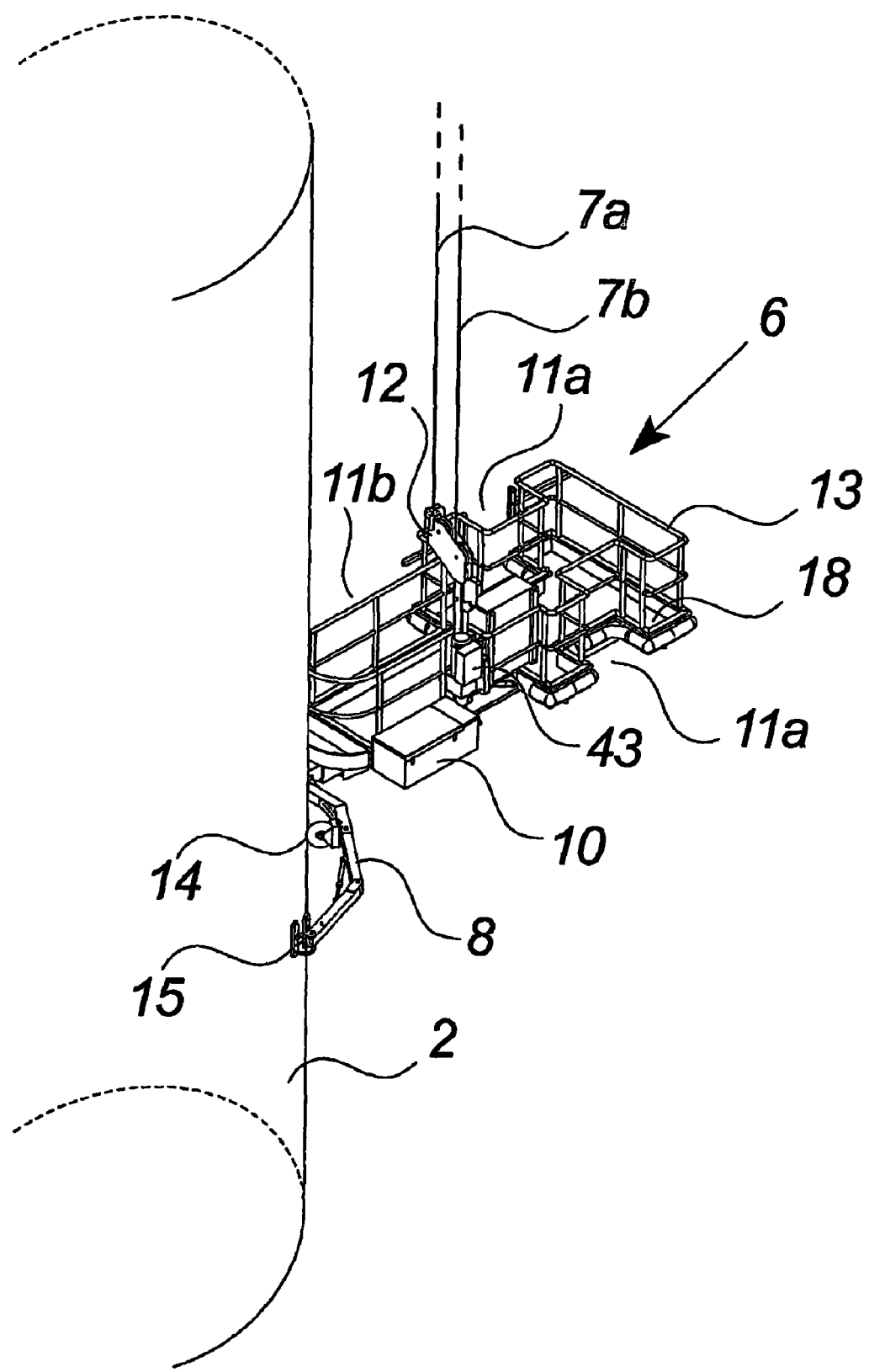
Figure 4:
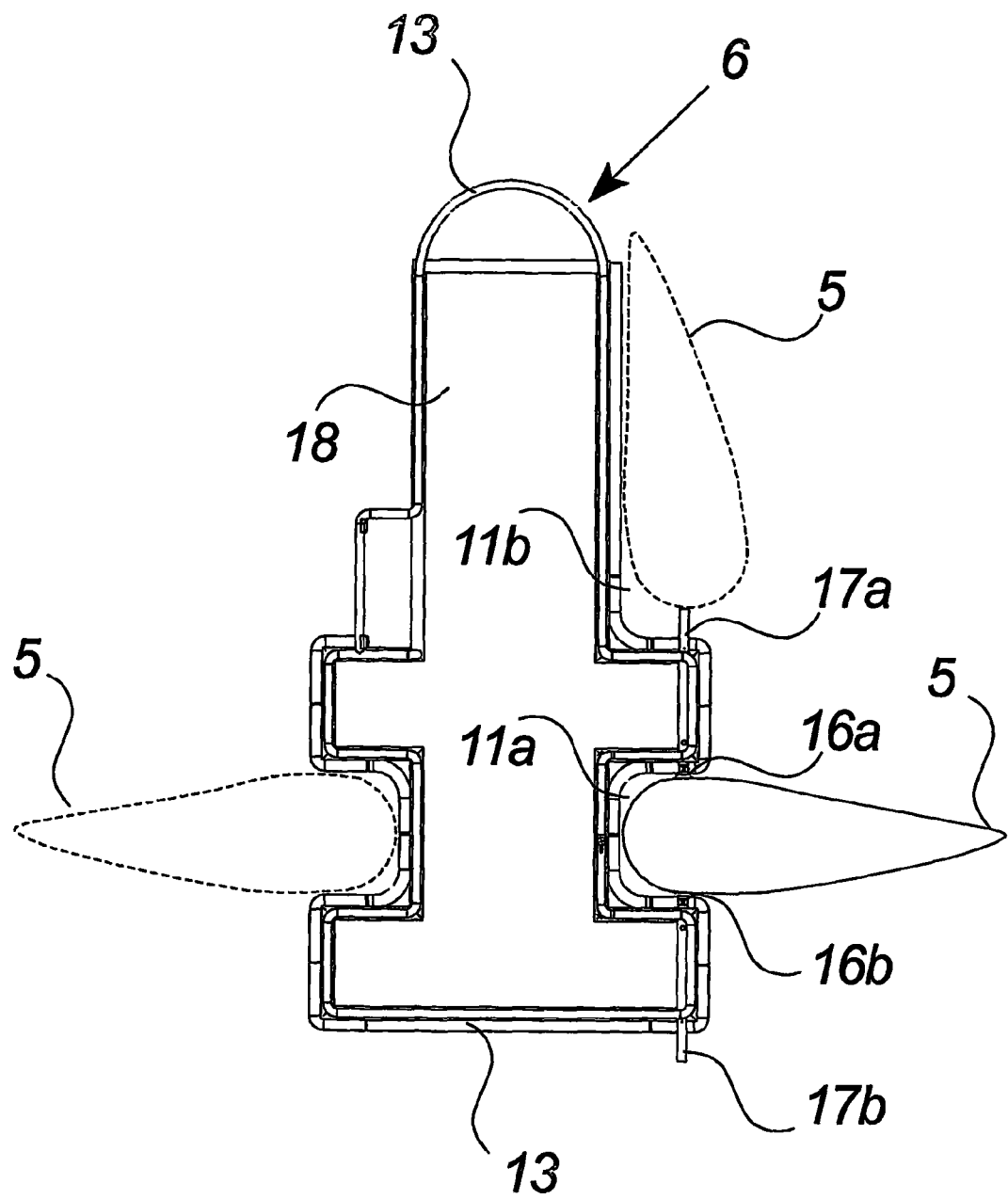
Figure 5:
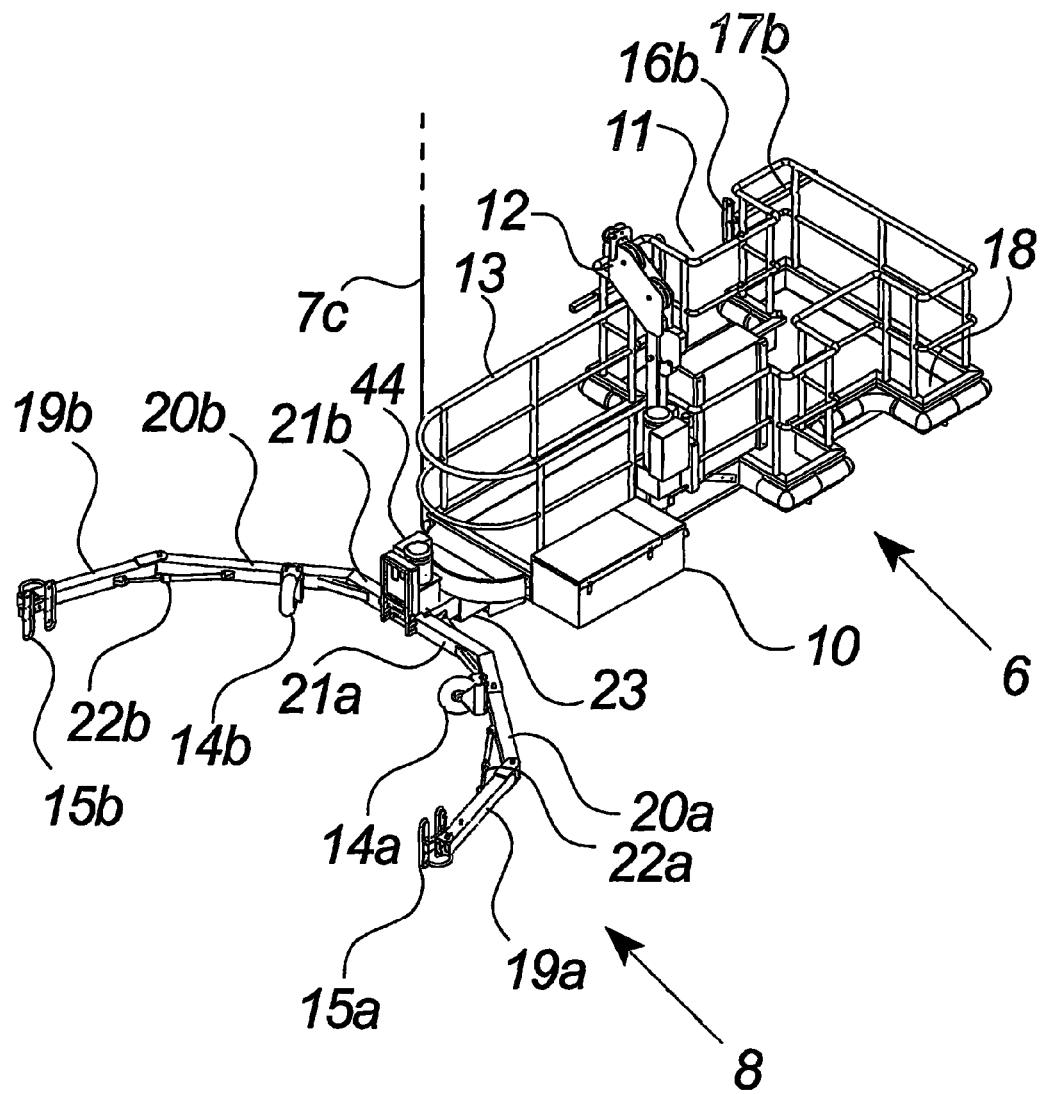
Figure 6:
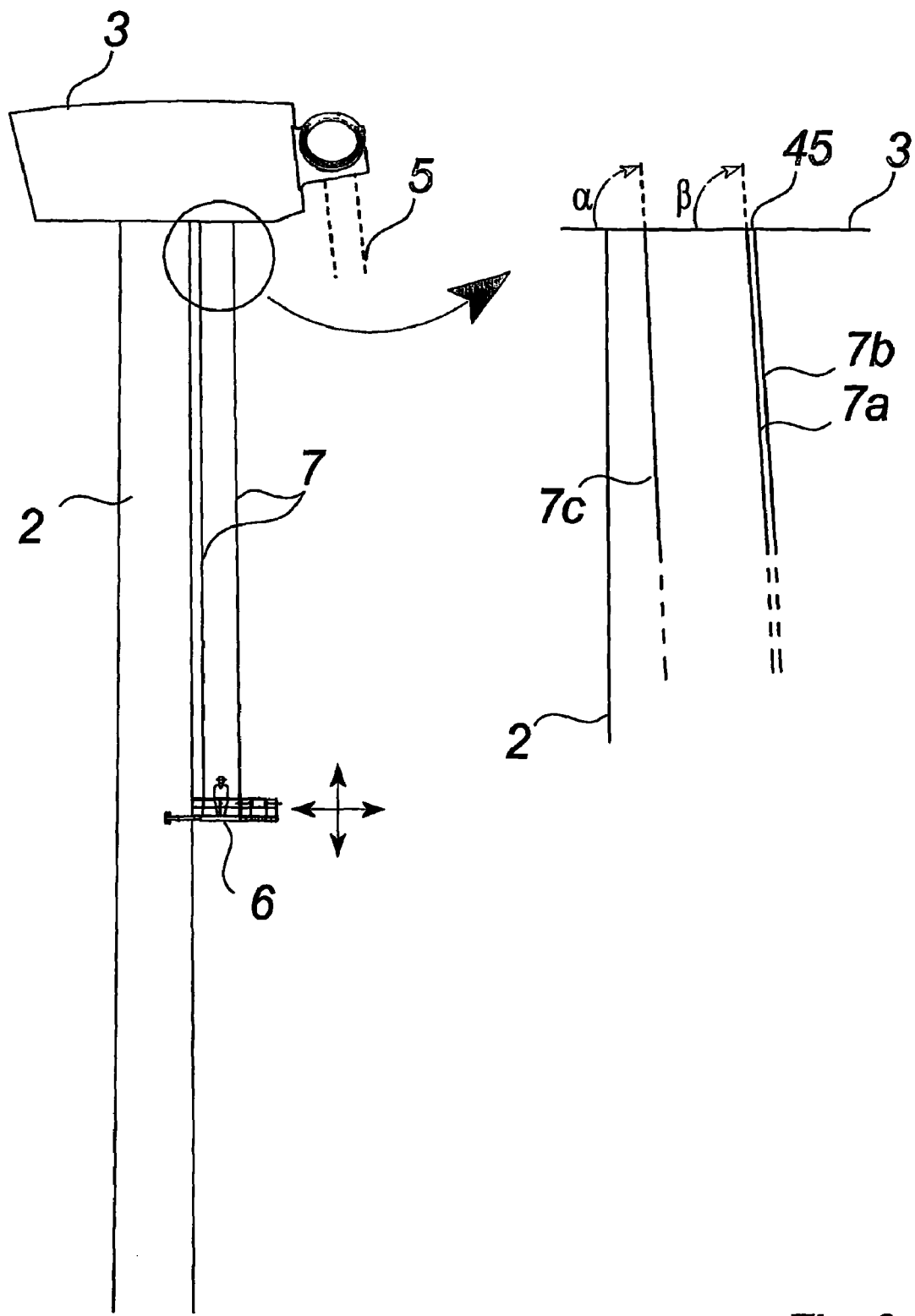
Figure 7A:
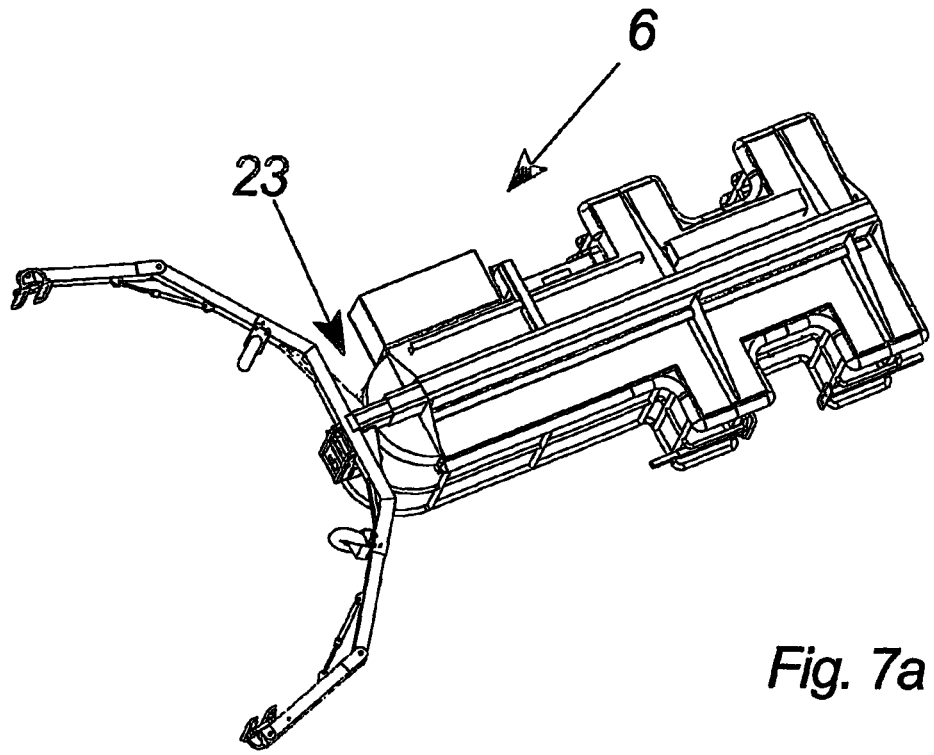
Figure 7B:
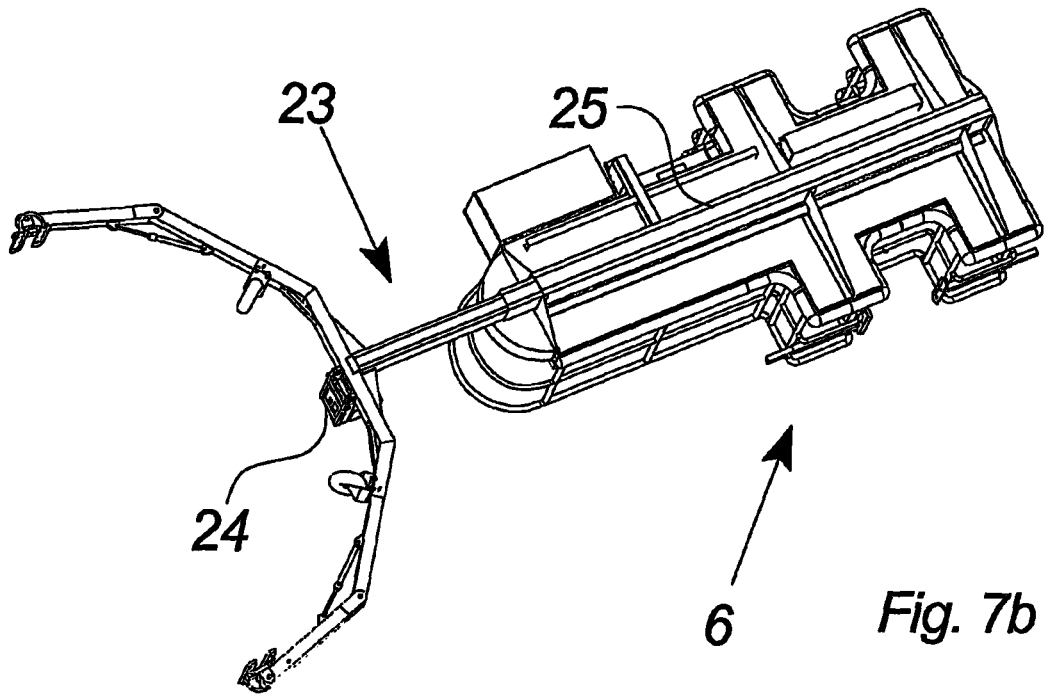
Figure 8A:
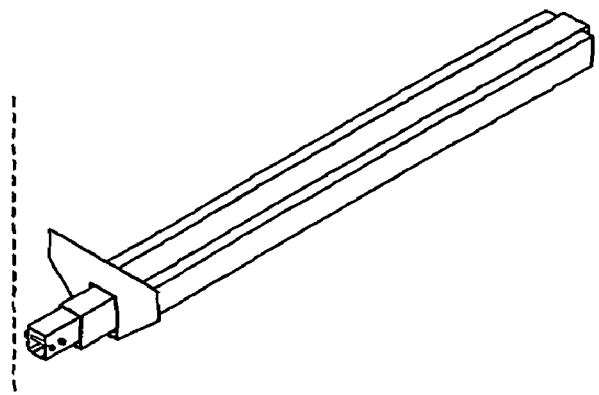
FIG. 8a illustrates the structure in a retracted position for the horizontal forcing means 23.
Figure 8B:
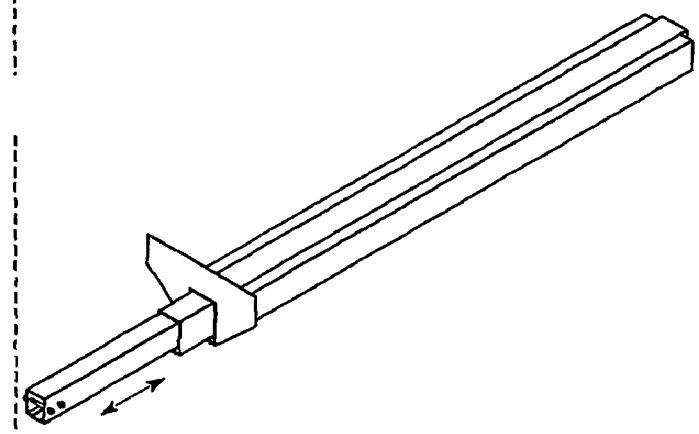
FIG. 8b illustrates the structure in an extracted position for a first horizontal forcing arm 23a of the horizontal forcing means 23.
Figure 8C:
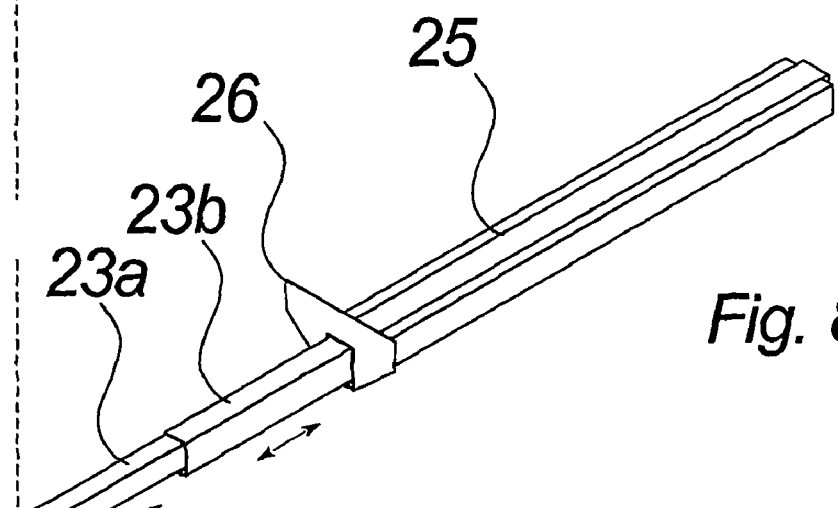

FIG. 8c illustrates the structure in an extracted position for a first and second horizontal forcing arm 23a, 23b of the horizontal forcing means 23. The figure illustrates the horizontal forcing means 23 with both arms in fully extracted positions. However, in further embodiments the number of arms may be more than two arms e.g. the use of three or four arms of a shorter length than the present two FIGS. 9a and 9b illustrate a preferred embodiment of the holding means 15 for the wind turbine tower.

The holding means are preferably flexible mounted onto the ends of the outer arm sections 19a, 19b of the gripping means 8. The flexibility may be used in order to adapt the holding means to the slightly sloping surface of the wind turbine tower 2.

Further, the holding means comprises two substantially oval holding devices (and rather long in an up-down direction) positioned next to each other. However, the number of holding devices and their shapes may be altered in order to meet different situations in which the present shape is preferred in order to advantageously absorb vertical forces.

Figure 9A:
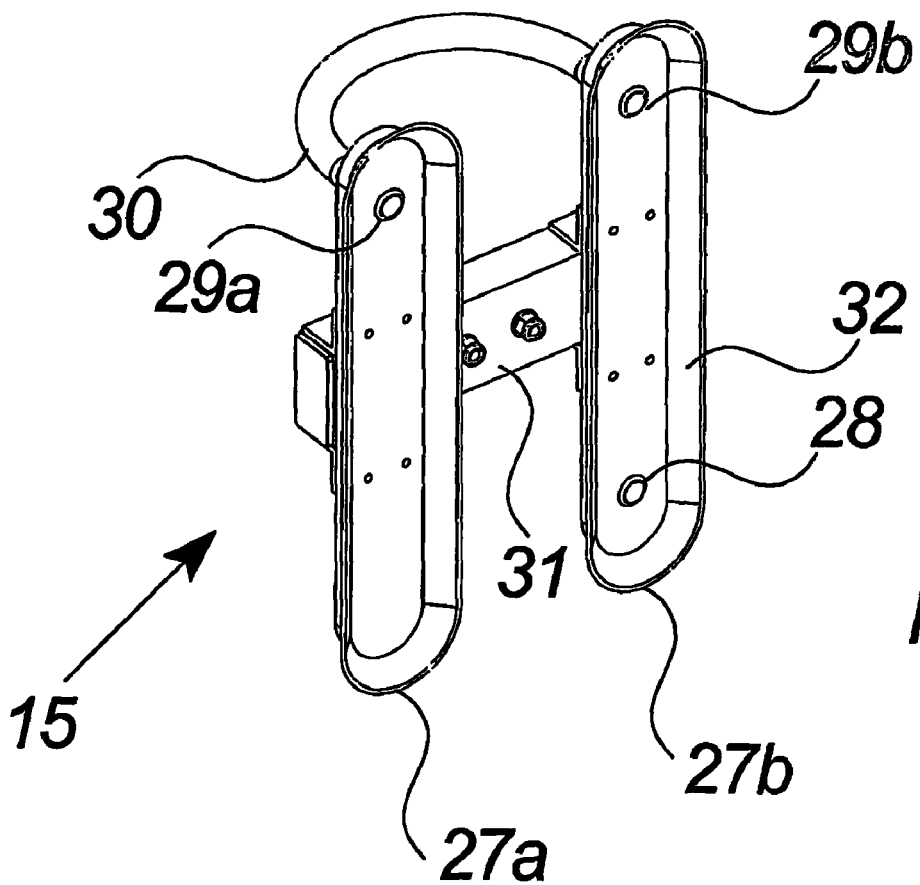
Figure 9B:
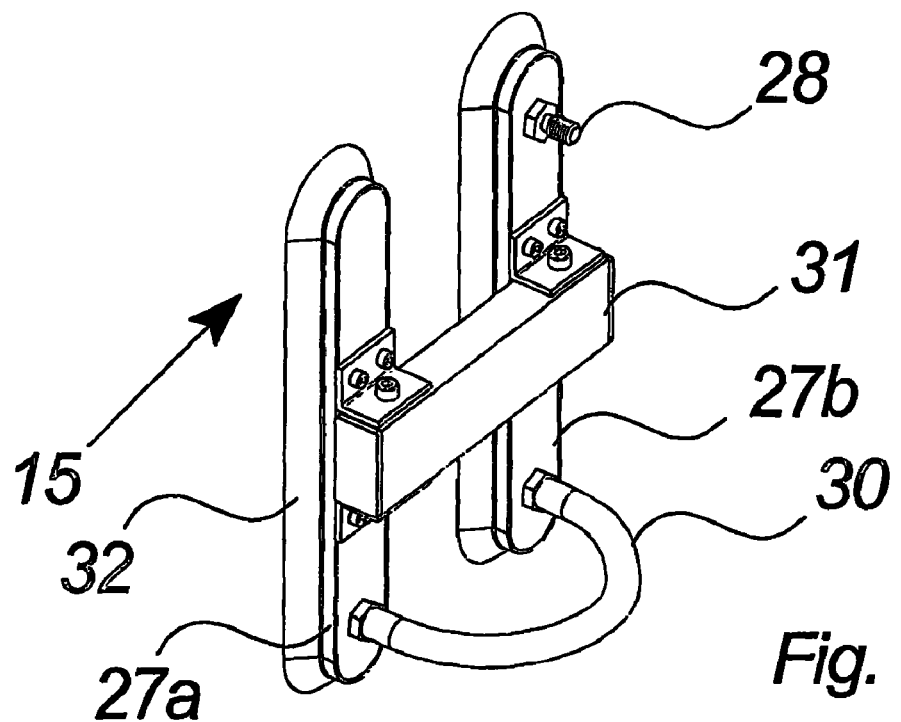

FIG. 9a illustrates the holding means 15 seen perceptively from the front. The holding means comprises an oval first and second suction or vacuum cup 27a, 27b.

The second cup 27b includes a suction opening 28 in one end of the cup in which the opening is connected to a suction pump with tube means. Further, the second cup 27b includes a connection opening 29b in the other end of the cup. The opening is connected with a connection tube 30 to a connection opening 29a in the first suction or vacuum cup 27a. The connection between the two suction or vacuum cups ensures that a common pressure condition is established in the cups.

The suction or vacuum cups may include rubber rims or lips 32 in order to retain the pressure condition inside the cups.

The two suction or vacuum cups are rigidly fastened to a connecting rod 31. The connecting rod 31 may on the other hand be flexibly fastened to the gripping means as mentioned above e.g. with some sort of a tip-up hinge.

FIG. 9b illustrates the holding means 15 seen perceptively from the opposite side after being rotated half a turn.

The figure especially illustrates the outlet of the suction opening 28 in which a tube, with connection to a suction pump, is to be mounted.

The two suction or vacuum cups on each side of the gripping means may be used in order to firmly engage the work platform to the wind turbine tower by applying a very low suction pressure or even vacuum inside the cups facing the tower surface. Together with the cable and the cable winding means the work platform may be held in place by the gripping means.

Figure 10A:
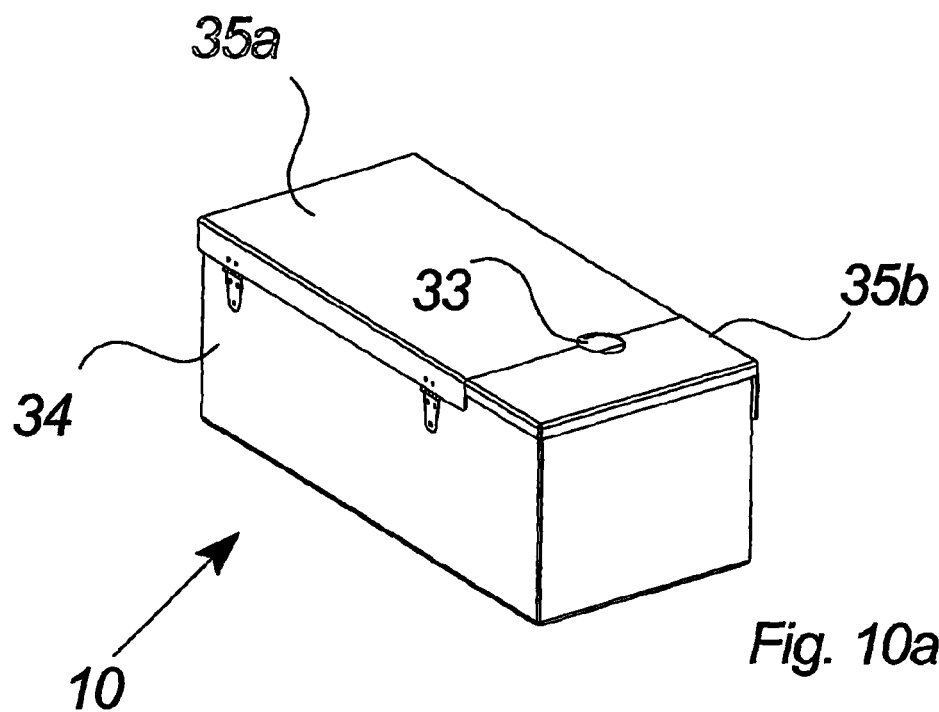
Figure 10B:
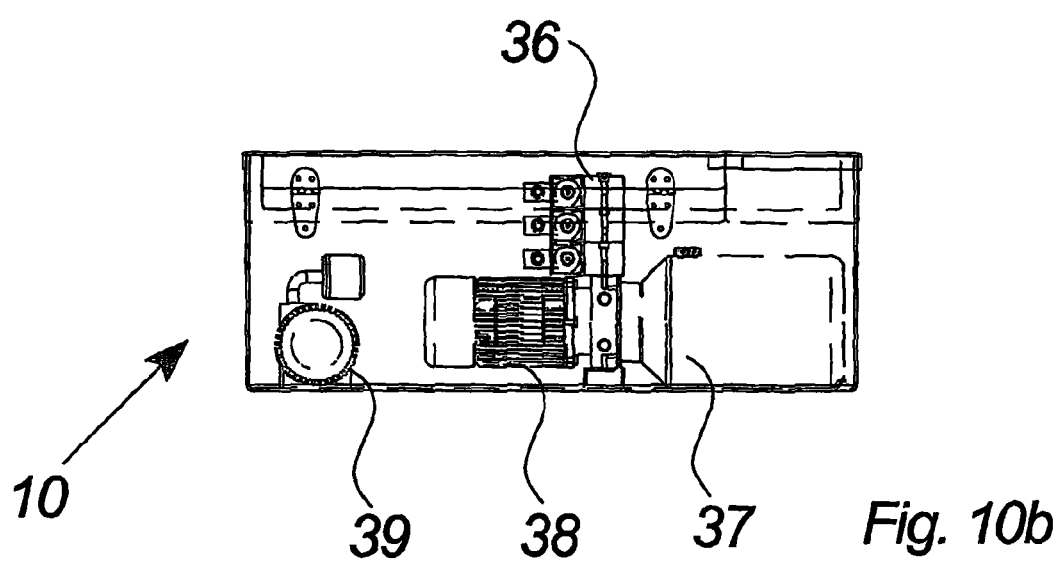

FIGS. 10a and 10b illustrates the hydraulic and/or pneumatic means positioned in a box 34 at one side of the work platform.

FIG. 10a illustrates the box 34 with ventilation opening 33 in a first and second box door 35a, 35b. The doors allow full access to the hydraulic and/or pneumatic means inside the box.

FIG. 10b illustrates some of the content in the box including needle valves 36 controlling the hydraulic pump and tank 39 with the motor 38. The magnetic controlled needle valves 36 thus control the hydraulic fluid pumped to the horizontal forcing means and other hydraulic actuated means of the work platform. The box further comprises a vacuum pump 39 that supplies the different suction or vacuum cups. The box may further comprise such means as electric accumulators and/or a diesel generator, a cable drum 37 in which the cables 7, 7a, 7b, 7c are accumulated and one or more containers comprising compressed air.

The air containers may be used as an energy source supplying some or all the energy consuming components of the work platform wherein the pressure of the containers preferably are quite high such as up to 40 bar.

In an embodiment of the invention, compressed air is used instead of hydraulic pressure in retracting/extracting the horizontal forcing means. Further, the compressed air is used to drive the motors of the cable winding means in which the normally used electric motors are replaced with pneumatic motors. Even further, the compressed air is used to establish the necessary vacuum pressure for the suction or vacuum cups. The containers may be reloaded with compressed air from a compressor installed in the truck (as mentioned above) e.g. during the transportation from one site of wind turbines to another. The remaining components such as the control means may be supplied with electric power from one or more electric accumulators.

The necessary energy may in another embodiment be supplied partly or totally from the hydraulic system in which the hydraulic oil is pressurized with nitrogen supplied from nitrogen containers.

Even further, in an embodiment the different components may be supplied with electric power e.g. in order to drive the hydraulic and vacuum pumps in which the electric power is supplied from the utility grid. An electric cable may connect the work platform with a power outlet inside the wind turbine e.g. a 400 or 24 V AC outlet. In another embodiment the cable connects the work platform with the generator of the truck wherein the truck is kept running in order to supply the necessary electric power without emptying the truck accumulators. The electric cable may hang freely or be winded with a cable retraction mechanism.

From the box the necessary air and/or hydraulic tubes extend to the different components that are supplied with suction or vacuum, pressurized air or hydraulic oil. Further, electric power cables may transfer energy from electric accumulators, a diesel generator or the utility grid to any electric actuated, activated or controlled components.

Figure 11:
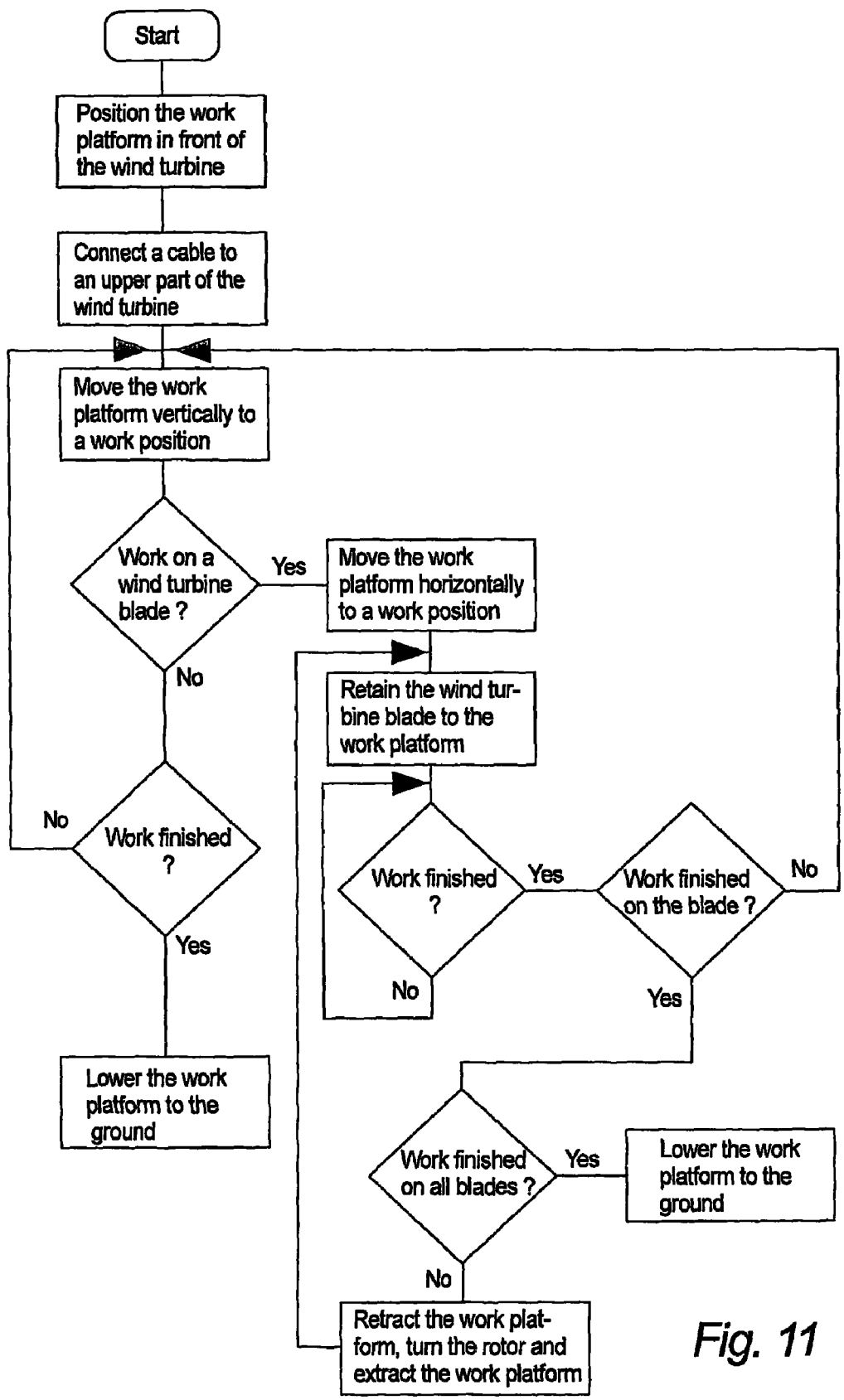

FIG. 11 illustrates a flow diagram relating to a method of servicing the outer components of a wind turbine.

The method may include some or all of the following steps of functionality in servicing a wind turbine such as the wind turbine tower:

- driving the truck with the work platform to the rural place of the wind turbine or wind turbine park.
- positioning the work platform in front of the wind turbine tower with the steering wheels of the gripping means touching the surface of the tower (step a of FIG. 11).
- connecting a cable to the wind turbine nacelle as described above (step b—part 1).
- connection of the cable to the cable winding means of the work platform in which the cable preferably is a bit angled in relation to a vertical angle forcing the work platform slightly against the tower (step b—part 2).
- vertically moving the work platform and one or more workers to a use position with the aid of the cable, the cable guiding means and the cable winding means (step c).
- securing the work platform to the wind turbine tower by activating the suction or vacuum cups 15 of the gripping means 8.
- work on the wind turbine tower e.g. checking and repainting areas of the tower.
- releasing the holding means and lowering the work platform to the ground and positioning the work platform on a transportation trailer (step f).
- recharging the electric accumulators during transportation of the work platform to new rural places of wind turbines.

In connection with the servicing of the wind turbine tower, a number of choices may be made including the decision regarding moving up or down when the work is finished in an area of the tower (step e). If the work is completed on the tower the work platform may be lowered to the ground.

The method may include some or all of the following steps of functionality in servicing a wind turbine such as the wind turbine blades:

driving the truck with the work platform to the rural place of the wind turbine or wind turbine park.

positioning the work platform in front of the wind turbine tower with the steering wheels of the gripping means touching the surface of the tower (step a of FIG. 11).

connecting a cable to the wind turbine nacelle as described above (step b—part 1).

connection of the cable to the cable winding means of the work platform in which the cable preferably is a bit angled in relation to a vertical angle forcing the work platform slightly against the tower (step b—part 2).

vertically moving the work platform and one or more workers to a use position with the aid of the cable, the cable guiding means and the cable winding means (step c).

securing the work platform to the wind turbine tower by activating the suction or vacuum cups 15 of the gripping means 8.

altering the horizontal position of the work platform by extracting the horizontal forcing means in order to meet a wind turbine blade (step g).

retaining the wind turbine blade at the work platform and servicing the section of the blade within reach (step h).

work on the wind turbine blade e.g. checking or cleaning areas of the blade.

altering the horizontal position of the work platform by retracting the horizontal forcing means e.g. Allowing the wind turbine blades to turn briefly before securing a new blade to the work platform and performing the service process on this blade (step l). The distance of the turn of the rotor is preferably approximately one third of a full turn in order to position the new blade in front of the blade docking area.

moving the work platform to a new use position with the aid of the cable and the cable winding means e.g. a higher position (step c).

securing the work platform to the wind turbine tower by activating the suction or vacuum cups 15 of the gripping means 8.

altering the horizontal position of the work platform by extracting the horizontal forcing means in order to meet a wind turbine blade (step g).

retaining the wind turbine blade at the work platform and servicing the section of the blade within reach (step h). . . . . and so forth . . .

releasing the holding means and lowering the work platform to the ground and positioning the work platform on a transportation trailer (step m).

recharging the electric accumulators during transportation of the work platform to new rural places of wind turbines.

In connection with the servicing of the wind turbine blades a number of choices may be made including the decision regarding moving up or down when the work is finished in an area of the blade (step i).

Even further, if the work is completed on one blade it may be decided to continue with servicing another blade (step j).

Even further, if the work is completed on all blades in question it may be decided to lower the work platform to the ground (step k).

Figure 12:
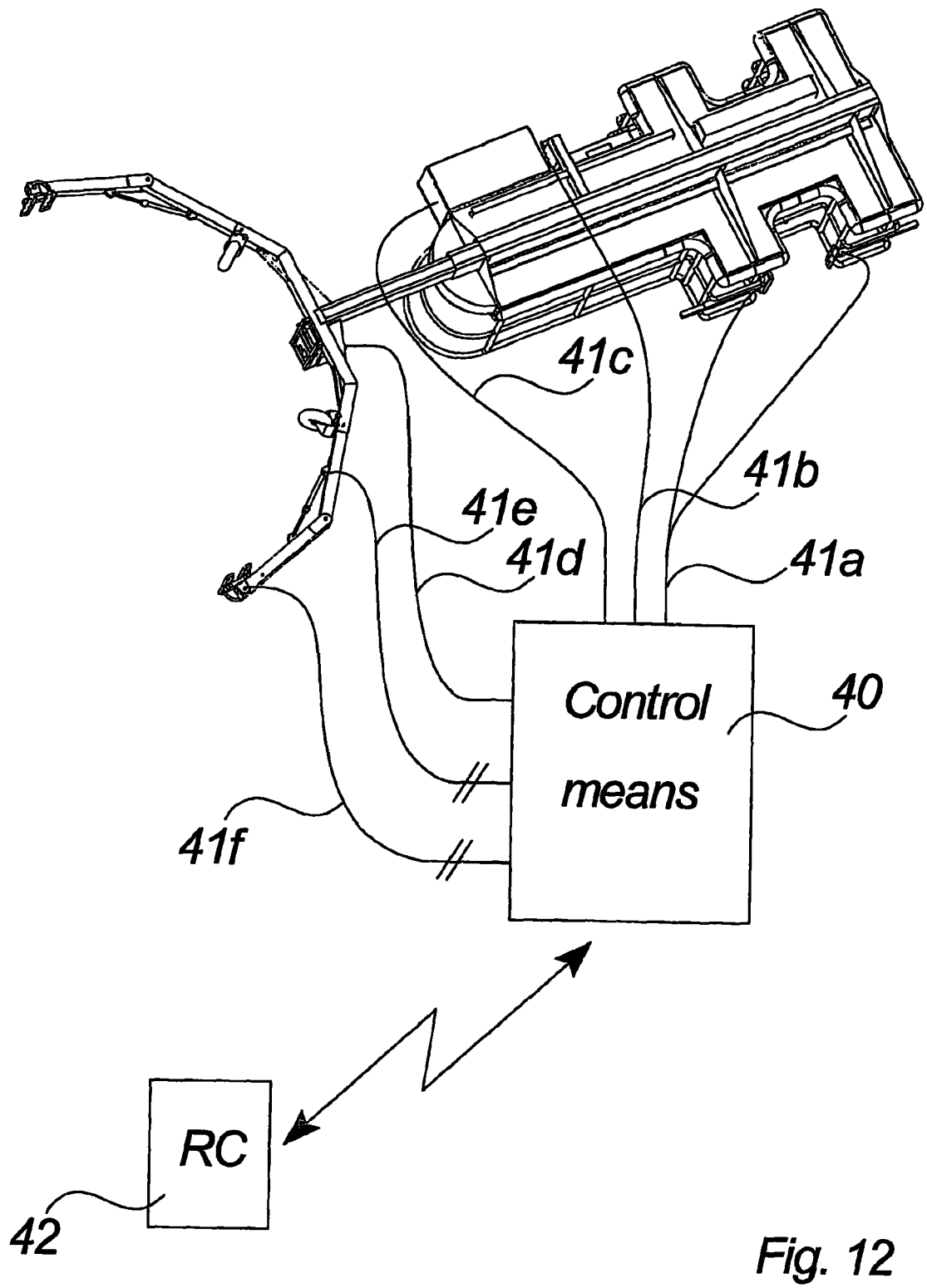

FIG. 12 illustrates an embodiment of a control system 40 in connection with a work platform according to the invention In order to control and monitor the functionalities of the work platform, it is necessary with a control system positioned on the work platform e.g. inside the box containing cable winding means. The control system is preferably a microprocessor-based system capable of receiving, transmitting, processing and storing signals. The control system comprises connections to the different means of the work platform that needs controlling or monitoring.

The connections of the work platform may be divided into different groups such as control cables 41a-41f ensuring that control signals are transferred to control valves, switches and relays and sensor cables returning monitor signal to the control system, said signals concerning the functionality of the different components.

The control cables may be cables 41a controlling the functionality of the suction or vacuum cups 16a, 16b of the retaining means for a wind turbine blade. Further cables 41f may control the functionality of the suction or vacuum cups 15a, 15b of the gripping means.

Other control cables 41b, 41d may control the functionality of the cable winding mechanisms 43, 44 for the inner and outer cables, respectively.

Even further, control cables 41c may control the functionality of the hydraulic and/or pneumatic components of the box 10. More control cables (not illustrated on the figure) may control the status of the electric accumulators, the air containers, the diesel generator or further components of the work platform.

The electric power cables may supply energy directly to mechanical means such as electric actuators converting the electricity to a physical change in position of the actuator rod e.g. the arm actuating means in the case they are electric driven. Further, the electricity may be supplied to pneumatic or hydraulic pumping means in which the pumping means supply pneumatic or hydraulic power to different actuating means such as the forcing means in the case they are pneumatic or hydraulic actuated. Even further, the suction or vacuum cups may be pneumatic supplied from one or more vacuum pumps, said pumps preferably being electrically driven.

The control cables connect the control systems with control switches and relays e.g. electric switches switching the electric power cables or hydraulic, pneumatic and vacuum pressure switches controlling the air or oil flow through the connection tubes.

The monitoring cables may direct different status signals of the work platform to the control system such as the energy level of the accumulators, the pressure levels etc.

If status signals indicate that the normal functionality of the work platform is not possible, e.g. due to low energy level of electric accumulators, the worker may choose to lower the work platform with the aid of a manually operated handle releasing the break of the cable winding means. The break release is preferably only partly ensuring that the lowering speed of the work platform is below the abovementioned speed limit. However, if the speed increases beyond the limit, the over speed break will take effect and slow down or even stop the work platform.

If it is possible the manual operation may be supplemented by the remaining electric energy of the accumulators e.g. Allowing the electric control of some necessary components of the work platform such as the gripping means. Further, the control system may define a lower limit for the accumulators wherein any normal functionality of the work platform is stopped if the limit is exceeded. After the limit has been exceeded, the work platform may preferably only be lowered.

The control system 40 may be wired or wirelessly connected to a remote control 42. The wireless connection is established by using electromagnetic airwaves such as radio or infrared waves.

The remote control allows a worker to control the different components of the work platform e.g. movement of the horizontal forcing means, the activation of the suction or vacuum cups or the raising/lowering of the platform. Further, the remote control may comprise display means for monitoring the above-mentioned status signals of the different components or other signals such as the position of the horizontal forcing means. Even further, the control means or the remote control may comprise sound generating means in order to inform the workers of the status of the work platform or one or more of the components of the platform.

The remote control may be held by one of the workers positioned on the work platform, on the ground or even in the nacelle.

The remote control that controls the control system may also control different components of the wind turbine. In an embodiment the remote control controls the means that turns the rotor in connection with the change of wind turbine blades at the work platform, e.g. the above-mentioned auxiliary device comprising an electric motor. Further, the remote control can control any winding mechanism in the nacelle.

Even further, the remote controlling of the work platform may be divided between several remote controls e.g. held by a worker on the work platform and a worker on the ground or in the nacelle. The worker on the ground or in the nacelle may remotely activate different components of the wind turbine while the worker on the platform controls the platform components with his remote control. Preferably, the remote control held by the worker on the platform overrules any other remote control e.g. in a master/slave remote control configuration.

The invention has been exemplified above with reference to specific examples. However, it should be understood that the invention is not limited to the particular examples described above but may be used in connection with a wide variety of applications. Further, it should be understood that especially the work platform according to the invention may be designed in a multitude of varieties within the scope of the invention as specified in the claims.

The invention claimed is:

1. Method of servicing outer components of a wind turbine with a work platform, said method comprising:
   positioning the work platform at a wind turbine tower of said wind turbine;
   connecting the work platform to an upper part of the wind turbine with at least one cable;
   raising the work platform with the cable and a cable winder to a position of use;
   holding the work platform to a side of the wind turbine tower by directly gripping the tower with a holder on the work platform, said holder comprising a gripper having at least one holding arm including a base arm section, an inner arm section, and an outer arm section; and
   moving the work platform horizontally by extracting or retracting a horizontal forcer of the work platform;
   said horizontal forcer positioned between said gripper and said work platform and connecting said gripper with said work platform, said forcer comprising a number of horizontal forcing arms telescopically integrated into each other; wherein said inner arm section and said outer arm section are pivotally connected and controlled by a holding arm actuator in at least one direction.

2. Method according to claim 1, wherein said holding is established with at least two sets of suction or vacuum cups.

3. Method according to claim 1, wherein said holding is established with at least two sets of electromagnets.

4. Method according to claim 1, wherein said holding is established with a retainer surrounding said wind turbine tower.

5. Method according to claim 1, wherein said holding is enhanced by positioning suction or vacuum cups or electromagnets on the ends of holding arms, said arms gripping around the exterior of the wind turbine tower.

6. Method according to claim 1, wherein the extracting or retracting is established telescopically by said horizontal forcing arms.

7. Method according to claim 1, wherein cable guide angles the cable outwards in relation to the wind turbine tower from the starting point of the cable.

8. Method according to claim 1, wherein said work platform is moved up or down by following and rolling with steering wheels of the platform on a surface of the wind turbine tower.

9. Work platform for servicing outer components of a wind turbine, said platform comprising:
   at least one cable connecting the work platform with an upper part of the wind turbine;
   a cable winder winding said at least one cable;
   a gripper for directly holding the work platform to a tower of said wind turbine, said gripper comprising at least one holding arm including a base arm section, an inner arm section, and an outer arm section; and
   a horizontal forcer positioned between said gripper and said work platform and connecting said gripper with said work platform, said forcer comprising a number of horizontal forcing arms telescopically integrated into each other;
   wherein said inner arm section and said outer arm section are pivotally connected and controlled by a holding arm actuator in at least one direction; and
   wherein said work platform is movable horizontally by extracting or retracting said horizontal forcer.

10. Work platform according to claim 9, wherein said at least one cable comprises a set of outer cables, said set including a main cable and one or more additional cables.

11. Work platform according to claim 10, wherein said at least one cable further comprises an inner cable or cables.

12. Work platform according to claim 11, wherein said inner and outer cables are fixed to an underside of a wind turbine nacelle at an inner and outer anchorage point in a direction from the tower or to anchorage points inside the nacelle.

13. Work platform according to claim 9, wherein said gripper comprises at least two sets of suction or vacuum cups.

14. Work platform according to claim 9, wherein said gripper comprises at least two sets of electromagnets.

15. Work platform according to claim 9, wherein said gripper comprises a retainer surrounding the wind turbine tower.

16. Work platform according to claim 9, wherein said gripper comprises at least two sets of suction or vacuum cups or electromagnets that are flexibly mounted to an end of said holding arm.

17. Work platform according to claim 9, wherein said gripper comprises one or more steering wheels.

18. Work platform according to claim 9, wherein guard rails and a foundation define a work area of said platform.

19. Work platform according to claim 18, wherein said gripper and the foundation are connected through said horizontal forcer.

20. Work platform according to claim 9, wherein a side or sides of said platform includes one or more indentations for receiving and docking one or more wind turbine blades.

21. Work platform according to claim 20, wherein said platform includes a retainer for retaining the wind turbine blade in one of said indentations.

22. Work platform according to claim 21, wherein said retainer includes one or more suction or vacuum cups positioned on one or more rods as a base part for the retainer.

23. Work platform according to claim 9, wherein said at least one cable is controlled by a cable guide.

24. Work platform according to claim 23, wherein a position of said cable guide controls an angling of the at least one cable.

25. Work platform according to claim 23, wherein said cable guide angles the cable outwards in relation to the wind turbine tower from an anchorage point of the cable.

26. Work platform according to claim 9, wherein said platform includes a control mechanism for controlling said holding arm actuator, said horizontal forcer, one or more suction or vacuum pumps and/or said cable winder.

27. Work platform according to claim 26, wherein said control mechanism is connected wired or wirelessly to and controlled by at least one remote control.

28. Work platform according to claim 26, wherein said control mechanism, said arm actuator, said horizontal forcer, said one or more suction or vacuum pumps and/or said cable winder are controlled with more than one remote control, said controls working in a master and slave configuration.

\* \* \* \* \*